United States Patent
Osman et al.

(10) Patent No.: US 12,115,441 B2
(45) Date of Patent: Oct. 15, 2024

(54) FIDELITY OF MOTION SENSOR SIGNAL BY FILTERING VOICE AND HAPTIC COMPONENTS

(71) Applicant: Sony Interactive Entertainment Inc., Tokyo (JP)

(72) Inventors: Steven Osman, San Mateo, CA (US); Olga Rudi, San Mateo, CA (US); Mahdi Azmandian, San Mateo, CA (US); Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 170 days.

(21) Appl. No.: 17/817,208

(22) Filed: Aug. 3, 2022

(65) Prior Publication Data

US 2024/0042308 A1 Feb. 8, 2024

(51) Int. Cl.
 *A63F 13/22* (2014.01)
 *A63F 13/211* (2014.01)
 *A63F 13/215* (2014.01)
 *G06F 3/01* (2006.01)
 *G06F 3/16* (2006.01)

(52) U.S. Cl.
 CPC ............ *A63F 13/22* (2014.09); *A63F 13/211* (2014.09); *A63F 13/215* (2014.09); *G06F 3/012* (2013.01); *G06F 3/016* (2013.01); *G06F 3/16* (2013.01)

(58) Field of Classification Search
 CPC ...... A63F 13/211; A63F 13/215; A63F 13/22; G06F 3/012; G06F 3/016; G06F 3/16
 See application file for complete search history.

(56) References Cited

U.S. PATENT DOCUMENTS

| | | | | |
|---|---|---|---|---|
| 3,665,397 | A * | 5/1972 | Di Napoli | G06Q 30/04 340/5.42 |
| 9,723,119 | B2 * | 8/2017 | Peeler | H04M 1/724 |
| 10,386,203 | B1 * | 8/2019 | Zheng | G01C 19/5776 |
| 10,643,595 | B2 * | 5/2020 | Macours | B06B 1/0253 |
| 10,895,639 | B2 * | 1/2021 | Yuasa | B60T 8/171 |
| 2012/0286943 | A1 * | 11/2012 | Rothkopf | G08B 6/00 340/407.1 |

(Continued)

FOREIGN PATENT DOCUMENTS

| | | | | |
|---|---|---|---|---|
| CN | 106061369 A | * | 10/2016 | .......... A61B 5/0205 |
| CN | 108135659 A | * | 6/2018 | ............ A61B 34/30 |

(Continued)

OTHER PUBLICATIONS

"Noise Reduction in the Accelerometer and Gyroscope Sensor with the Kalman Filter Algorithm," by Alfian Ma'arif et al., Journal of Robotics and Control (JRC), Nov. 2020. (Year: 2020).*

(Continued)

*Primary Examiner* — Steven J Hylinski
(74) *Attorney, Agent, or Firm* — John L. Rogitz; John M. Rogitz

(57) ABSTRACT

To improve the fidelity of a motion sensor, voice-induced components in signals from the motion sensor as well as haptic-induced components in signals from the motion sensor are canceled prior to outputting the final motion signal to an app requiring knowledge of device motion, such as motion of a HMD for a computer game.

11 Claims, 7 Drawing Sheets

(56) References Cited

U.S. PATENT DOCUMENTS

| | | | | |
|---|---|---|---|---|
| 2013/0027359 A1* | 1/2013 | Schevin | ................ | G06F 21/83 |
| | | | | 345/177 |
| 2014/0056461 A1 | 2/2014 | Afshar | | |
| 2017/0220111 A1* | 8/2017 | Nakamura | ............ | G06F 3/0416 |
| 2017/0092084 A1 | 12/2017 | Rihn et al. | | |
| 2018/0061192 A1* | 3/2018 | Chen | .................... | G06F 1/1694 |
| 2018/0091702 A1 | 3/2018 | Oba et al. | | |
| 2019/0004082 A1* | 1/2019 | Saboune | ................ | G01P 15/02 |
| 2019/0162848 A1* | 5/2019 | Yuasa | .................... | G01S 15/89 |
| 2019/0320766 A1* | 10/2019 | Sobol | .................... | A61B 5/681 |

FOREIGN PATENT DOCUMENTS

| | | | | | |
|---|---|---|---|---|---|
| CN | 109142789 A | * | 1/2019 | ............ | G01P 15/02 |
| CN | 109350017 A | * | 2/2019 | ............ | A61B 5/01 |
| EP | 0006315 A1 | * | 1/1980 | | |
| JP | 2008232791 A | * | 10/2008 | | |
| JP | 4990774 B2 | * | 8/2012 | ............ | H04S 7/304 |
| WO | WO-2017030248 A1 | * | 2/2017 | ............ | G06F 3/016 |
| WO | WO-2017195946 A1 | * | 11/2017 | ............ | G10L 15/06 |
| WO | WO-2021101811 A1 | * | 5/2021 | ........... | A63F 13/332 |
| WO | WO-2022259227 A1 | * | 12/2022 | | |

OTHER PUBLICATIONS

"International Search Report and Written Opinion", dated Jan. 24, 2024, from the counterpart PCT application PCT/US23/71379.

* cited by examiner

FIDELITY OF MOTION SENSOR SIGNAL BY FILTERING VOICE AND HAPTIC COMPONENTS

FIELD

The present application relates generally to improving fidelity of motion sensor signal by filtering voice and haptic components.

BACKGROUND

Motion sensors may be mounted on a head-mounted display (HMD) and provided to an application such as a computer game application for use by the application in presenting virtual reality (VR) or augmented reality (AR) video on the display consistent with the pose of the head of the wearer of the HMD.

As recognized herein, by mounting motion sensors on an HMD or for that matter other device (game controller, cell phone), the motion sensors can pick up subtle vibrations from a user while speaking or from haptic generator-induced vibrations. Unfortunately, this reduces the fidelity of the "true" motion output by the motion sensor.

SUMMARY

Accordingly, an assembly includes at least one device with at least one motion sensor configured to generate signals. The assembly also includes at least one processor configured with instructions to subtract signals from at least one microphone from the signals generated by the motion sensor to render a first signal, and transmit the first signal to an application using motion sensor signals.

In some embodiments the processor may be configured to cancel haptic generator-induced components from the signals generated by the motion sensor to render the first signal. This may be done at least in part by subtracting haptic signals from the signals generated by the motion sensor. The haptic signals may be generated by at least one haptic signal detector. Or, the haptic signals may include at least one haptic signal characterization supplied from at least one computer application. An example of the computer application includes at least one computer game engine configured to use the signals generated by the motion sensor to render at least one computer game on at least one display. The display may include at least one head-mounted display (HMD) supporting the motion sensor.

In another aspect, a method includes receiving signals from at least one motion sensor on at least one device. The method further includes canceling voice and/or haptic components in the signals from the at least one motion sensor. The method includes, after the canceling, transmitting the signals from the at least one motion sensor to at least one application for use by the application of the signals from the at least one motion sensor.

In another aspect, a head-mounted display (HMD) for generating demanded images of at least one computer simulation from a game engine includes at least one motion sensor configured to generate motion signals, and at least one processor configured for canceling voice components and/or haptic components of the motion signals prior to sending the motion signals to the game engine for rendering the computer simulation on the HMD according to the motion signals.

The details of the present application, both as to its structure and operation, can be best understood in reference to the accompanying drawings, in which like reference numerals refer to like parts, and in which:

DETAILED DESCRIPTION

Figure 1:
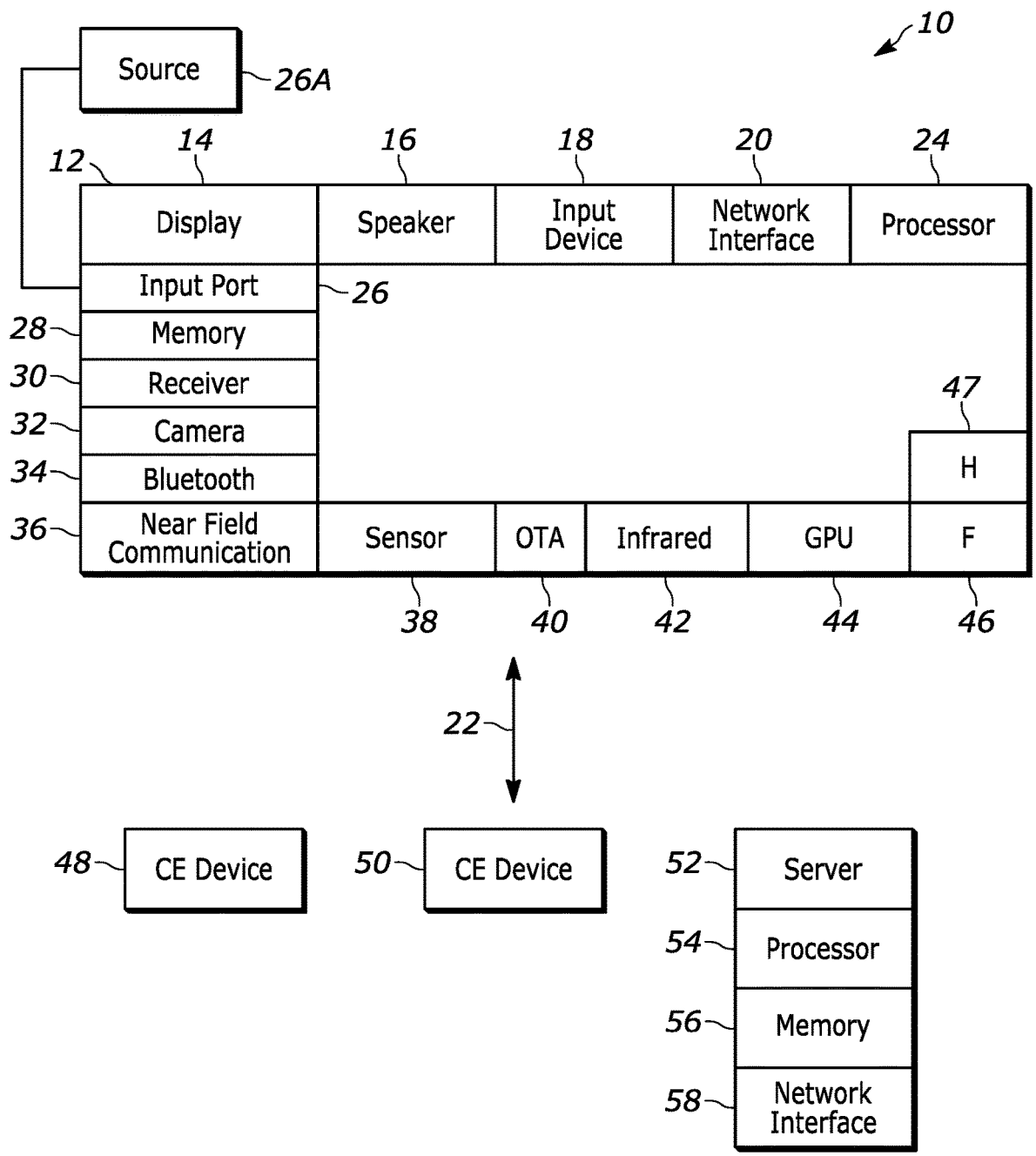
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptic/vibration generators 47 may be provided for generating tactile signals that can be sensed by a person holding or in contact with the device. The haptic generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
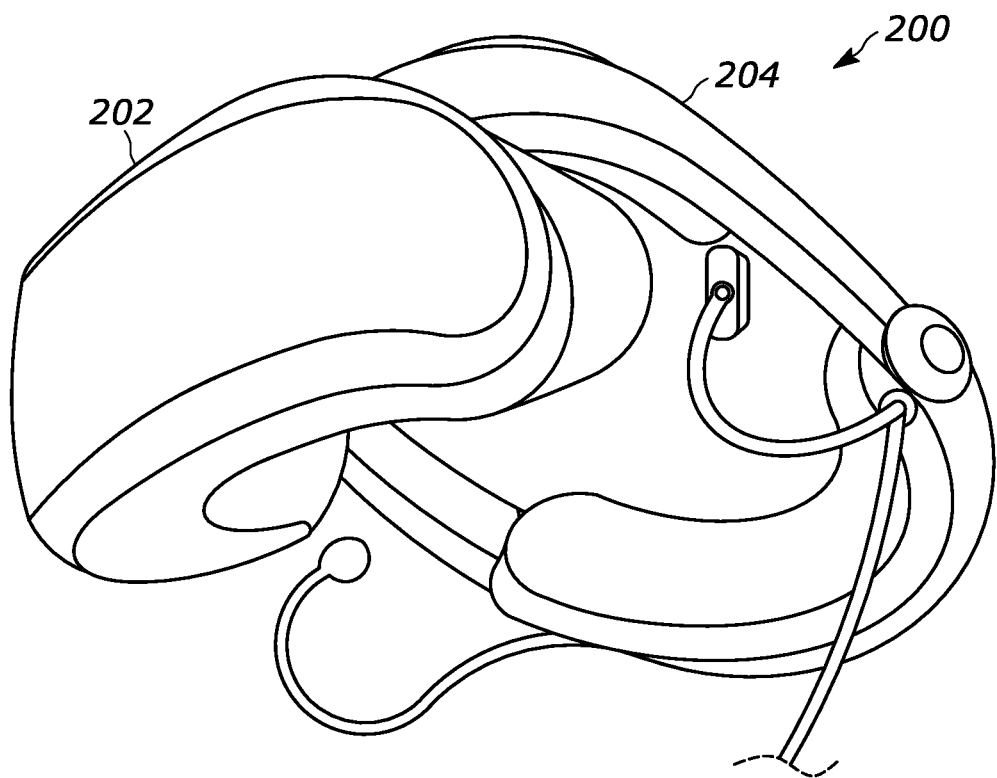
FIG. 2 illustrates a first embodiment of a HMD.
Figure 3:
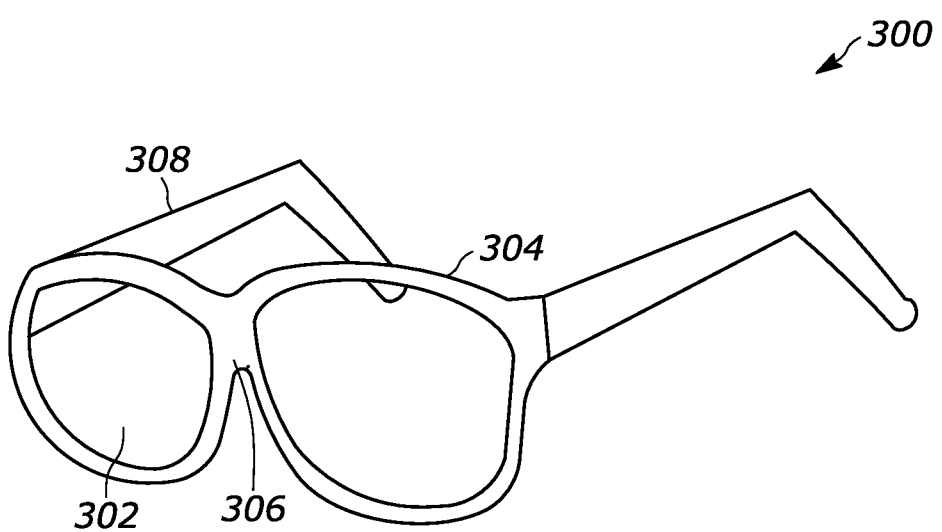
FIG. 3 illustrates a second embodiment of a non-limiting example HMD.

FIGS. 2 and 3 illustrate two non-limiting example embodiments of a HMD. The HMD 200 shown in FIG. 2 is a VR HMD with an oval-shaped display 202 mounted on a headband 204 that encircles the head of a wearer.

In contrast, the HMD 300 shown in FIG. 3 is configured as eyeglasses with left and right lens-shaped displays 302 mounted in an eyeglass-style frame 304 having a nose bridge 306 between the lenses 302 and left and right templates 308 extending back to lie against a wearer's head.

Note that present principles are not necessarily limited to HMDs. Other components with motions sensors, such as, for example, computer game controllers and cell phones, may incorporate present principles.

Figure 4:
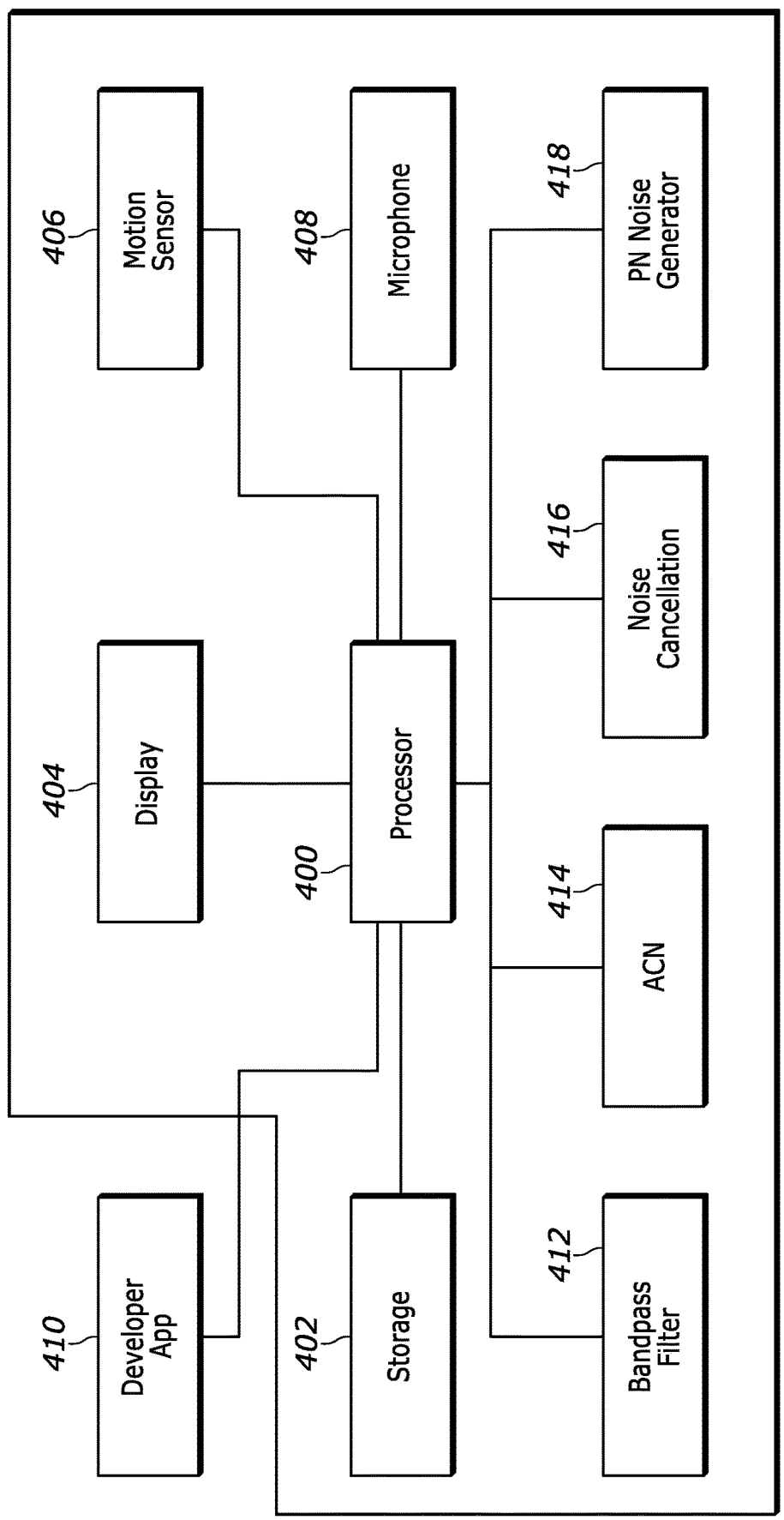
FIG. 4 illustrates a block diagram of example components of an HMD.

FIG. 4 illustrates example non-limiting components of a device with a motion sensor such as an HMD or computer game controller or cell phone consistent with present principles.

One or more processors 400 may access instructions on one or more computer storages or memories 402 to configure the processor to execute techniques described herein. The processor 400 may control one of more displays 404 and receive signals from one or more motion sensors 406 such as any one or more of the motion sensors divulged herein. The processor 400 also may receive input from one or more microphones 408 and may output motion signals generated by the motion sensor 406 to one or more applications 410 such as one or more developer applications such as computer game applications.

Additionally, the processor 400 may access one or more of a bandpass filter 412, an ACN 414, a noise cancelation engine or algorithm 416, and a noise generator 418 such as a pseudo-random (PN) noise and/or white noise generator, for purposes to be shortly disclosed.

Figure 5:
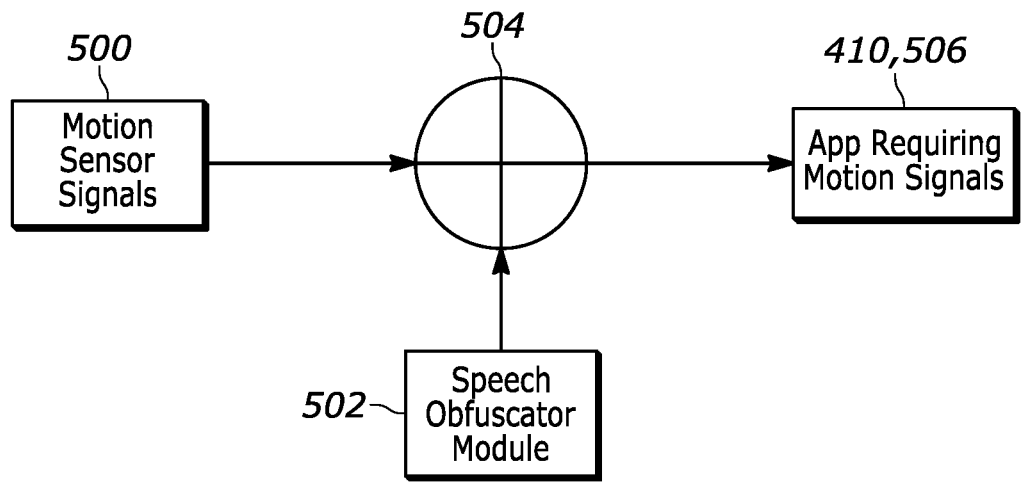
FIG. 5 illustrates an example signal flow diagram.

FIG. 5 illustrates an overall signal processing flow for obfuscating or removing voice-generated components in the signals 500 from the motion sensor 406 shown in FIG. 4. A speech obfuscator module 502 generates noise or microphone signals to add to the motion sensor signals 500 at state 504 or filters motion sensor signals at state 504. The resulting motion sensor signals, with voice-generated components either removed or obfuscated, are then sent to an application 506 requiring motion signals representing motion of the head of a wearer of the HMD, such as the developer app 410 shown in FIG. 4.

Note that the logic of FIG. 5 may be enabled all of the time during use, or only some of the time during use, such as when the microphone of a HMD is muted or unavailable to the application. When the microphone is not muted or unavailable to an application, there may be little reason to obfuscate or remove speech components in motion signals since the application already has speech from the microphone. It is further to be noted that while the microphone 408 in FIG. 4 may have been muted by the user or may have been rendered unavailable to an application requiring motion signals, signals from the microphone may still be used internally by the HMD processor to remove voice components of motion signals.

It is noted that human voice frequencies may typically fall in the range of one to four kilohertz (1-4 KHz). For men, the fundamental voice frequency may fall in the range of eighty-five to one hundred fifty-five Hertz (85-155 Hz), and the fundamental voice frequency for women may fall in the range of one hundred sixty-five to two hundred fifty-five Hertz (165-255 Hz). However, the range of one to four kilohertz (1-4 KHz) may be of higher importance for speech intelligibility, and in one example this is the range into which noise is introduced or energy removed from the signal from the motion sensor, it being understood that the fundamental frequency ranges alternatively or additionally may be used.

Figure 6:
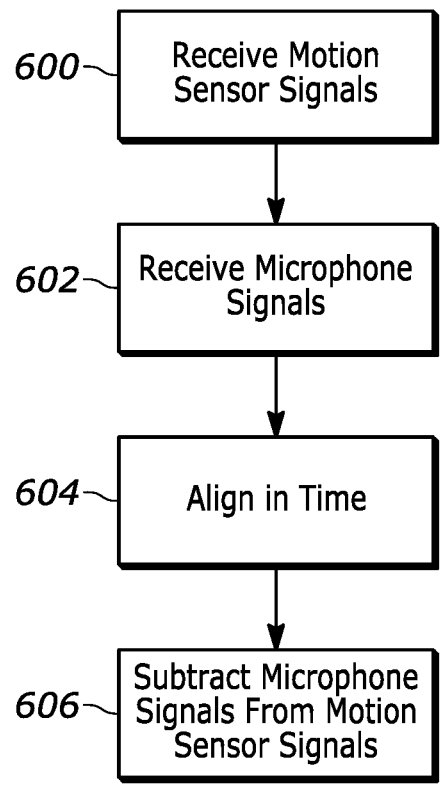
FIG. 6 illustrates in example flow chart format example logic for a first technique for removing voice signals in motion sensor signals.

Referring now to FIG. 6, in a first technique motions signals from the motion sensor(s) such as the motion sensor 406 shown in FIG. 4 are received by the processor such as the processor 400 in FIG. 4 at block 600. Proceeding to block 602, voice-generated signals may be received from microphone(s) such as the microphone 408 shown in FIG. 4, with the two sets of signals being temporally aligned at block 604 by use of, e.g., time stamps generated by the component producing the signals or by the processor upon time of receipt. The signals from the microphone are subtracted from the signals from the motion sensor at block 606 prior to sending the motion signals to an app such as the app 410 shown in FIG. 4.

Thus, the presence of a microphone can help in removal of the speech signal from the input. The microphone can be used to record ambient sound and voice, and noise cancellation algorithms can be employed to subtract that signal from the subtle vibrations in the motion sensor data before the sensor data is made available to the game developer. Thus, the technique of FIG. 6 subtracts signals picked up by the microphone from signals generated by the motion sensor by the same physical act (speaking) that generated the microphone signals. ANC (active noise cancellation) techniques can be adapted to cancel noise from a motion sensor's data.

Figure 7:
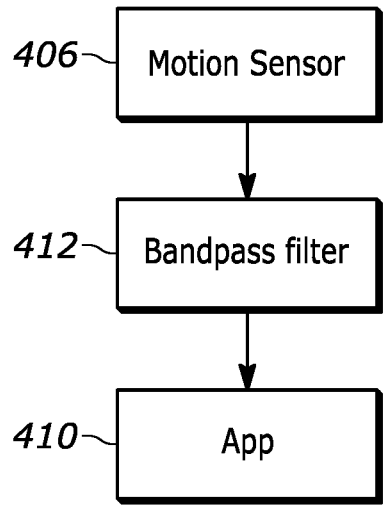
FIG. 7 illustrates an example signal flow diagram for a second technique for removing voice signals in motion sensor signals.

FIG. 7 illustrates a second technique in which signals from the motion sensor(s) 406 shown in FIG. 4 are sent through one or more filters 412 such as the bandpass filter. After filtering, the motion signals are sent to an app such as the app 410 shown in FIG. 4.

Accordingly, a band pass filter can be used to naively subtract signals within the voice range, for example 1-4 kHz, from the motion sensor data before passing the motion signals to a game developer app 410. A smaller range may be filtered that still results in an acceptable degradation of intelligibility of speech components in the motion signals.

This is particularly effective if the user requests a heightened security mode. Although the filter might potentially remove some useful information from the motion data, in general a player's head is unable to move at the frequency range of voice signals, so the performance degradation should be minimal, with the exception of the latency introduced by such a filter.

Figure 8:
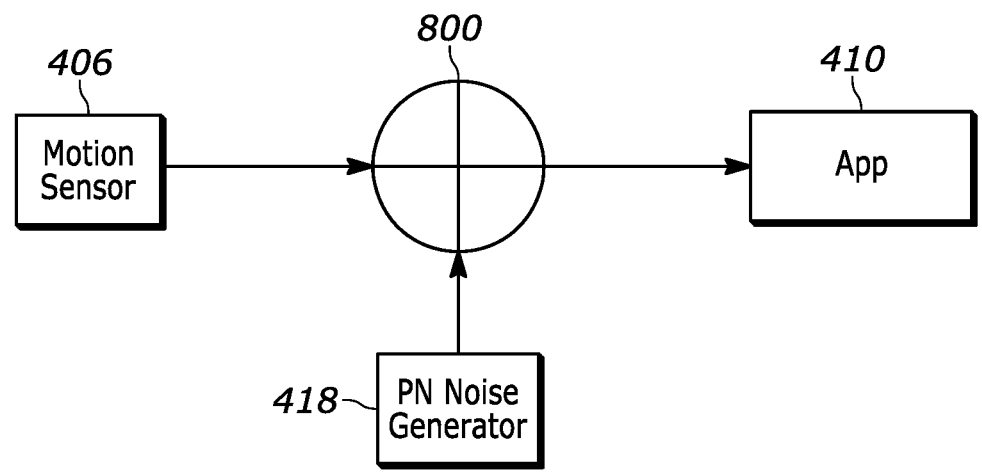
FIG. 8 illustrates an example signal flow diagram for a second technique for obfuscating voice signals in motion sensor signals.

FIG. 8 illustrates yet a third embodiment in which signals from a motion sensor such as the motion sensor 406 shown in FIG. 4 are obfuscated at addition state 800 by adding statistical noise from, e.g., the PN noise generator 418 shown in FIG. 4 and/or from a white noise generator or other sound signal generator, and then, after obfuscation, are sent to an app such as the developer app 410 shown in FIG. 4. Thus, statistical noise can be blended into the motion sensor signal before passing the motion signals to game developer apps. This is the equivalent of a white noise generator or running the shower or radio in the background while trying to have a private conversation. This can help to obfuscate the player's speech since it is combined with additional speech-like noise. The noise preferably is generated in the entire spectrum of the human voice frequency range, e.g., 1-4 kHz, although a smaller range may be used that still results in an acceptable degradation of intelligibility of speech components in the motion signals.

Noises from different environment than the environment of the motion sensor may be blended into the motion sensor signal so a malicious developer cannot anticipate what noise might be blended in and remove it.

Machine learning (ML) may be used in the techniques described herein. For example, a ML model may be used in the technique of FIG. 6 to learn voice-caused components in the motion sensor signals. Such a model may be trained on data of motion sensor signals with ground truth indications of which components were caused by speech.

ML may be used in the techniques of FIGS. 7 and 8 to learn types of noises and decide whether a particular component in a type of noise should be removed or obfuscated by added-in noise. A ML model may be trained on data indicating noise types with ground truth labels, frequencies, etc.

The techniques of FIGS. 6-8 may be used individually to the exclusion of other techniques, or two or more of the techniques of FIGS. 6-8 may be implemented simultaneously by a HMD. All three techniques may be implemented by an HMD. A user may be given the option to enable and disable techniques herein by selecting an appropriate selector on a user interface audibly or visually or tactilely presented on any device described herein to obfuscate or remove voice-generated components of motion signals.

Figure 9:
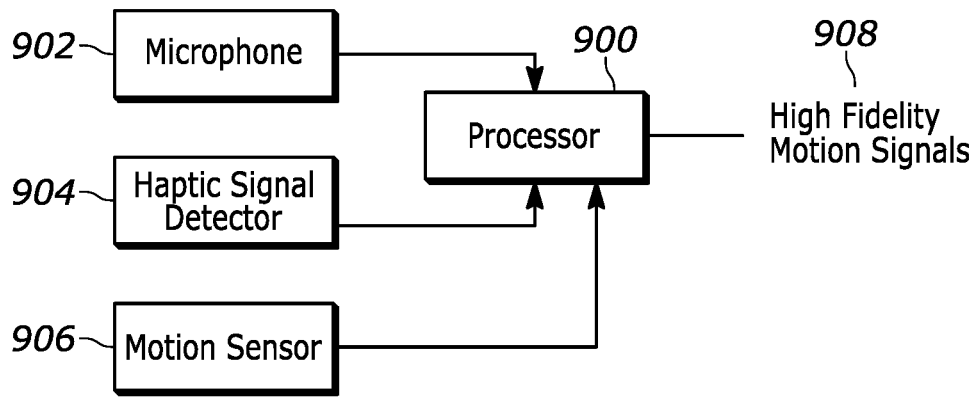
FIG. 9 illustrates an example block diagram of an example system for rendering high fidelity motion signals.

FIG. 9 illustrates that apart from conversation security, principles above can be leveraged to produce motion signals of, e.g., a HMD for use by an application that have higher fidelity than they would otherwise if voice and/or haptic components were sensed by the motion sensor and included in the motion signal. That is, present principles provide a way to filter out components of a motion signal that are not caused by motion of the device (such as a HMD, controller, or phone) but that instead are induced by voices creating vibration that the motion sensor senses and/or by haptic signal generators that cause vibrations which are picked up by the motion sensor. In this way, a higher fidelity motion signal more truly representative of motion of the device to which the motion sensor is attached can be provided to applications requiring such motion signals. Examples of such signals that may be filtered out include yawning, respiration, heart rate, and cell phone in the player's pocket vibrating as detected by, e.g., motion sensors, heart rate sensors and other biometric sensors, etc., as recognized by a trained ML model.

FIG. 9 illustrates a first example architecture. A processor 900 such as any one or more of the processors discussed herein receives input from a microphone 902 and a haptic signal detector 904. The haptic signal detector 904 may be any appropriate sensor that can pick up vibrations caused by a haptic signal generator that may be associated with a computer game console or controller, for instance. A motion sensor 906 also provides input to the processor 900 representing motion of a device on which the motion sensor 906 is mounted, e.g., a HMD.

Preferably, the haptic signal detector is not mounted on the same device as the motion sensor 906 is mounted, so that output of the haptic signal detector does not contain components induced by motion of the device on which the motion sensor 906 is mounted. In an example, the haptic signal detector 904 may be mounted on a desk or game console or other object and may communicate wirelessly with the processor 900.

The signals from the three sensors 902, 904, 906 are aligned in time using principles discussed above and the haptic and voice signals from the haptic signal detector 904 and microphone 902 are subtracted from the signal from the motion sensor 906 to cancel voice- and haptic-related components in the signal from the motion sensor 906. The resulting output 908 is a high-fidelity signal that includes substantially only motion-induced signal owing to motion of the device on which the motion sensor 906 is mounted.

Figure 10:
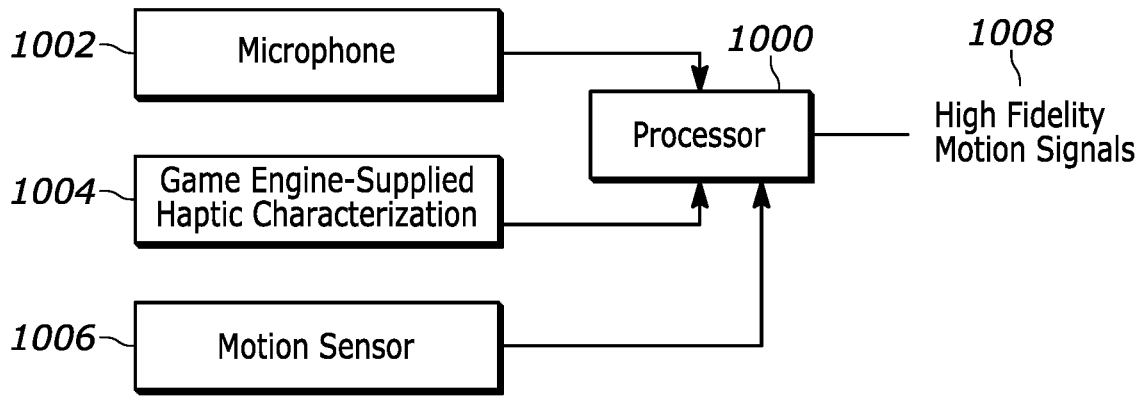
FIG. 10 illustrates another example block diagram of an example system for rendering high fidelity motion signals.

FIG. 10 illustrates a second example architecture. A processor 1000 such as any one or more of the processors discussed herein receives input from a microphone 1002 and a haptic signal characterization 1004 that may be supplied from a computer game engine presenting a computer game on a HMD or other device on which a motion sensor 1006 is mounted. The game engine typically is the application requiring motion signals representing motion of the device on which the motion sensor 1006 is mounted. The game engine knows what haptic signals it is demanding and the characteristics (such as frequency, phase, amplitude, etc.) and timing thereof, and so can provide the haptic signal characterization 1004 to the processor 1000.

The signals from the microphone 1002, haptic signal characterization 1004, and motion sensor 1006 are aligned in time using principles discussed above and the haptic signal characterization 1004 and voice signals from the microphone 1002 are subtracted from the signal from the motion sensor 1006 to cancel voice- and haptic-related components in the signal from the motion sensor 1006. The resulting output 1008 is a high-fidelity signal that includes substantially only motion-induced signal owing to motion of the device on which the motion sensor 1006 is mounted.

Figure 11:
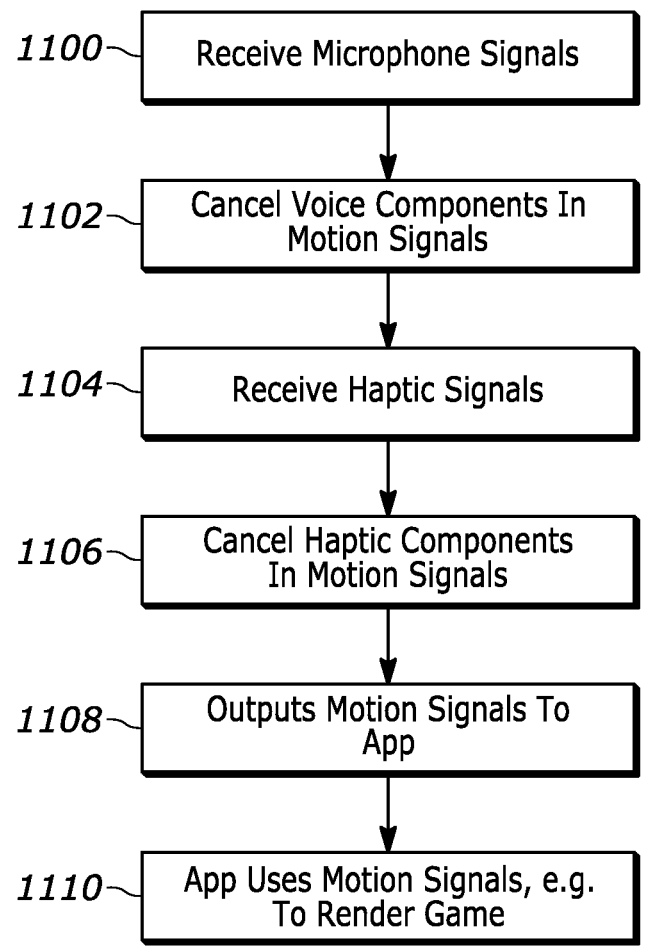
FIG. 11 illustrates example logic in example flow chart format for rendering high fidelity motion signals.

FIG. 11 illustrates the above principles in example flow chart format, it being understood that the order of certain blocks in FIG. 11 may be changed. Commencing at block 1100, signals from a microphone are received and subtracted at block 1102 from motion signals from a motion sensor to cancel voice-induced components of the motion signals.

Moving to block 1104, haptic signals are received, either from the haptic signal detector 904 in FIG. 9 or the haptic signal characterization 1004 in FIG. 10. Proceeding to block 1106, haptic-induced components in the motion signals are canceled by, e.g., subtracting the haptic signals received at block 1104 from the motion signals. The resulting high fidelity motion signals are output at block 1108 for use by an application such as a game engine at block 1110 in rendering a computer simulation such as a computer game such as a TV and/or a HMD.

While the particular embodiments are herein shown and described in detail, it is to be understood that the subject matter which is encompassed by the present invention is limited only by the claims.

What is claimed is:

1. An assembly, comprising:
   at least one device comprising at least one motion sensor configured to generate signals; and
   at least one processor configured with instructions to:
   subtract signals from at least one microphone from the signals generated by the motion sensor to cancel haptic generator-induced components from the signals generated by the motion sensor to render a first signal; and
   transmit the first signal to an application using motion sensor signals.

2. The assembly of claim 1, wherein the at least one processor is configured to cancel haptic generator-induced components from the signals generated by the motion sensor at least in part by subtracting haptic signals from the signals generated by the motion sensor.

3. The assembly of claim 2, wherein the haptic signals are generated by at least one haptic signal detector.

4. The assembly of claim 2, wherein the haptic signals comprise at least one haptic signal characterization supplied from at least one computer application.

5. The assembly of claim 4, wherein the at least one computer application comprises at least one computer game engine configured to use the signals generated by the motion sensor to render at least one computer game on at least one display.

6. The assembly of claim 5, wherein the at least one display comprises at least one head-mounted display (HMD) supporting the motion sensor.

7. A head-mounted display (HMD) for generating demanded images of at least one computer simulation from a game engine, comprising:
   at least one motion sensor configured to generate motion signals; and
   at least one processor configured for canceling voice components and/or haptic components of the motion signals and sending the motion signals to the game engine for rendering the computer simulation on the HMD according to the motion signals, wherein the processor is configured for canceling haptic components.

8. The HMD of claim 7, wherein the processor is configured for canceling voice components.

9. The HMD of claim 7, wherein the processor is configured for canceling voice components at least in part by subtracting signals from at least one microphone from the motion signals.

10. The HMD of claim 7, wherein the processor is configured for canceling haptic components at least in part by subtracting signals from least one haptic signal detector from the motion signals.

11. The HMD of claim 7, wherein the processor is configured for canceling haptic components at least in part by subtracting signals supplied by the game engine from the motion signals.

\* \* \* \* \*